(12) United States Patent
Ghebrebrhan et al.

(10) Patent No.: US 10,427,367 B1
(45) Date of Patent: Oct. 1, 2019

(54) RETRO-REFLECTIVE THREAD, METHOD OF MANUFACTURING SAME AND A TEXTILE

(71) Applicant: U.S. Government as Represented by the Secretary of the Army, Natick, MA (US)

(72) Inventors: Michael Ghebrebrhan, Cambridge, MA (US); Landa Hoke, Leominster, MA (US)

(73) Assignee: U.S. Government as Represented by the Secretary of the Army, Washington, DC (US)

(*) Notice: Subject to any disclaimer, the term of this patent is extended or adjusted under 35 U.S.C. 154(b) by 717 days.

(21) Appl. No.: 15/051,966

(22) Filed: Feb. 24, 2016

(51) Int. Cl.
| B29D 11/00 | (2006.01) |
| D01F 6/00 | (2006.01) |
| A41D 13/01 | (2006.01) |
| B29K 23/00 | (2006.01) |
| B29K 33/04 | (2006.01) |

(52) U.S. Cl.
CPC ........ B29D 11/00605 (2013.01); A41D 13/01 (2013.01); D01F 6/00 (2013.01); *B29K 2023/12* (2013.01); *B29K 2033/04* (2013.01); *B29K 2995/003* (2013.01); *B29K 2995/0026* (2013.01)

(58) Field of Classification Search
CPC ........ B29D 11/00865; B29D 11/00903; B29D 11/00605; D01F 6/00; A41D 13/01
See application file for complete search history.

(56) References Cited

U.S. PATENT DOCUMENTS

| 3,050,824 | A | * | 8/1962 | Lemelson | ................ | D01F 1/10 |
| | | | | | | 139/420 R |
| 4,336,092 | A | * | 6/1982 | Wasserman | ............... | D01D 5/42 |
| | | | | | | 156/269 |
| 4,697,407 | A | * | 10/1987 | Wasserman | ............... | D01D 5/42 |
| | | | | | | 428/372 |
| 8,033,671 | B1 | * | 10/2011 | Nilsen | .................... | G02B 5/124 |
| | | | | | | 359/529 |
| 8,764,202 | B1 | * | 7/2014 | Kimball | .................. | G02B 5/12 |
| | | | | | | 359/515 |
| 2004/0180199 | A1 | * | 9/2004 | Kang | ..................... | D02G 3/182 |
| | | | | | | 428/364 |

* cited by examiner

*Primary Examiner* — Mathieu D Vargot
(74) *Attorney, Agent, or Firm* — Roger C. Phillips (57) ABSTRACT

Disclosed is a retro-reflective thread 100 including an internal section 10; a plurality of fibers 12, each fiber comprising a respective longitudinal axis and a respective surface and each fiber comprising a first material that is at least partially optically transmissive, and wherein said plurality of fibers are configured with their respective longitudinal axes substantially co-linearly aligned with one another and said plurality of fibers are interconnected in series around said internal section and wherein a first part 12b of said respective surface of each of said plurality of fibers faces into said internal section; and a reflective material 14 provided on said first part of said respective surface of each of said plurality of fibers.

21 Claims, 9 Drawing Sheets

RETRO-REFLECTIVE THREAD, METHOD OF MANUFACTURING SAME AND A TEXTILE

FIELD OF THE INVENTION

The present invention relates to a retro-reflective thread and to a textile comprising at least one said retro-reflective thread. The present invention further relates to a method of manufacturing a retro-reflective thread.

BACKGROUND

Retro-reflectivity is the property where incident light from a localized source, for example a headlight, flashlight, or the moon, is mostly returned to the source even if the reflecting surface is not facing the source. In addition, such surfaces scatter little light in other directions. Retro-reflective surfaces increase visibility in low visibility conditions. Clothes, decalcomanias, and signs are major end products for retro-reflective surfaces. Typically, such surfaces are constructed from an array of miniaturized refractive elements bonded onto a reflective surface. Common retro-reflectors include metal-coated high index glass spheres and cube corner prisms with metalized back coatings. The retro-reflective surfaces themselves are sown or otherwise bonded onto an article that is desired to have an area of retro-reflectivity. Fibers with innate retro-reflectivity have remained elusive to date. Prior attempts to produce, via extrusion, such a fiber have included uniform circular cross-section fibers and star-shaped cross-section fibers, the latter being designed to mimic a cube corner retro-reflector with 90° inner angles and a reflective coating.

Although known retro-reflectors and techniques for using them have proven useful, there are disadvantages and drawbacks. Room for improvement remains and would be a welcome advance in the art.

SUMMARY OF THE INVENTION

In one aspect, the invention provides a retro-reflective thread comprising an internal section, a plurality of fibers and a reflective material. Each said fiber comprises a respective longitudinal axis and a respective surface. Each said fiber comprises a first material that is at least partially optically transmissive. Said plurality of fibers are configured with their respective longitudinal axes substantially co-linearly aligned with one another. Said plurality of fibers are interconnected in series around said internal section and a first part of said respective surface of each of said plurality of fibers faces into said internal section. Said reflective material is provided on said first part of said respective surface of each of said plurality of fibers.

In an embodiment, each of said plurality of fibers is substantially circular in cross-section. In an alternative embodiment, each of said plurality of fibers is substantially elliptical in cross-section.

In an embodiment, said internal section is substantially circular in cross section and has radius, $R_{core}$, and each said fiber has a radius, $R_{surface}$. Said plurality of fibers, N, is inversely proportional to the ratio of $R_{surface}$ to $R_{core}$.

In an embodiment, interconnected in series comprises said plurality of fibers arranged in a spaced series and the retro-reflective thread further comprises a plurality of connecting elements. Each of said plurality of connecting elements being located between and interconnects a respective pair of said plurality of fibers.

In an alternative embodiment, interconnected in series comprises each of said plurality of fibers arranged touching a directly preceding one of said plurality of fibers and touching a directly subsequent one of said plurality of fibers.

In an embodiment, each of said plurality of fibers arranged just touching a directly preceding one of said plurality of fibers and just touching a directly subsequent one of said plurality of fibers, and said plurality of fibers, N, is given by $$N = \frac{\pi}{\arcsin\left(\frac{R_{surface}}{R_{core}}\right)}$$

In an embodiment, the maximum radius, $R_{surface}$, of each of said plurality of fibers is given by, $$R_{surface} = R_{core}\sin\left(\frac{\pi}{N}\right),$$

where N is said plurality of fibers.

In an embodiment, said first material is a substantially transparent polymer. In an embodiment, said first material is one of polypropylene and polyester. In an alternative embodiment, said first material is a glass.

In an embodiment, said first material has a refractive index in the range 1.5 to 2.2. In an embodiment, said first material has a refractive index in the range 1.85 to 2.05. Preferably, said first material has a refractive index of substantially 1.9.

In an embodiment, said first material is substantially optically transmissive at visible wavelengths of light. In an alternative embodiment, said first material is substantially optically transmissive at infra-red wavelengths of light and said first material is substantially absorptive at visible wavelengths of light.

In an embodiment, said reflective material is one of a reflective metal, a reflective alloy and a polymer doped with reflective particles.

In an embodiment, said reflective material comprises a coating provided on said first part of said respective surface of each of said plurality of fibers.

In an embodiment, said internal section comprises a polymer core. In an alternative embodiment, said internal section comprises a core of said reflective material.

In an embodiment, said internal section has one of a circular cross-section and a non-circular cross-section.

In another aspect, the invention provides a textile comprising at least one retro-reflective thread. The retro-reflective thread comprises an internal section, a plurality of fibers and a reflective material. Each said fiber comprises a respective longitudinal axis and a respective surface. Each said fiber comprises a first material that is at least partially optically transmissive. Said plurality of fibers are configured with their respective longitudinal axes substantially co-linearly aligned with one another. Said plurality of fibers are interconnected in series around said internal section and a first part of said respective surface of each of said plurality of fibers faces into said internal section. Said reflective material is provided on said first part of said respective surface of each of said plurality of fibers.

In an embodiment, each of said plurality of fibers is substantially circular in cross-section. In an alternative embodiment, each of said plurality of fibers is substantially elliptical in cross-section.

In an embodiment, said internal section is substantially circular in cross section and has radius, $R_{core}$, and each said fiber has a radius, $R_{surface}$. Said plurality of fibers, N, is inversely proportional to the ratio of $R_{surface}$ to $R_{core}$.

In an embodiment, interconnected in series comprises said plurality of fibers arranged in a spaced series and the retro-reflective thread further comprises a plurality of connecting elements. Each of said plurality of connecting elements being located between and interconnects a respective pair of said plurality of fibers.

In an alternative embodiment, interconnected in series comprises each of said plurality of fibers arranged touching a directly preceding one of said plurality of fibers and touching a directly subsequent one of said plurality of fibers.

In an embodiment, each of said plurality of fibers arranged just touching a directly preceding one of said plurality of fibers and just touching a directly subsequent one of said plurality of fibers, and said plurality of fibers, N, is given by $$N = \frac{\pi}{\arcsin\left(\frac{R_{surface}}{R_{core}}\right)}$$

In an embodiment, the maximum radius, $R_{surface}$, of each of said plurality of fibers is given by, $$R_{surface} = R_{core} \sin\left(\frac{\pi}{N}\right),$$

where N is said plurality of fibers.

In an embodiment, said first material is a substantially transparent polymer. In an embodiment, said first material is one of polypropylene and polyester. In an alternative embodiment, said first material is a glass.

In an embodiment, said first material has a refractive index in the range 1.5 to 2.2. In an embodiment, said first material has a refractive index in the range 1.85 to 2.05. Preferably, said first material has a refractive index of substantially 1.9.

In an embodiment, said first material is substantially optically transmissive at visible wavelengths of light. In an alternative embodiment, said first material is substantially optically transmissive at infra-red wavelengths of light and said first material is substantially absorptive at visible wavelengths of light.

In an embodiment, said reflective material is one of a reflective metal, a reflective alloy and a polymer doped with reflective particles.

In an embodiment, said reflective material comprises a coating provided on said first part of said respective surface of each of said plurality of fibers.

In an embodiment, said internal section comprises a polymer core. In an alternative embodiment, said internal section comprises a core of said reflective material.

In an embodiment, said internal section has one of a circular cross-section and a non-circular cross-section.

In a further aspect, the invention provides a method of manufacturing a retro-reflective thread. The method comprises steps a. to c. Step a. comprises forming a thread by: forming a core comprising a first surface; and forming a plurality of fibers. Each said fiber comprises a respective longitudinal axis and a respective surface. Said plurality of fibers are configured with their respective longitudinal axes substantially co-linearly aligned with one another and said plurality of fibers are interconnected in series around said core. Each said fiber comprises a first material that is at least partially optically transmissive. Step b. comprises removing said core to form a void. Said core is removed such that a first part of said surface of each of said plurality of fibers faces into said void. Step c. comprises delivering a reflective material in a fluid state into said void, thereby providing said reflective material on said first part of said surface of each of said plurality of fibers.

In an embodiment, forming said plurality of fibers comprises forming said plurality of fibers in a spaced series and forming a plurality of connecting elements, each connecting element being formed between and interconnecting a respective pair of said plurality of fibers.

In an alternative embodiment, forming said plurality of fibers comprises forming each of said plurality of fibers to be touching a directly preceding one of said plurality of fibers and to be touching a directly subsequent one of said plurality of fibers.

In an embodiment, said core comprises a second material that is soluble in a first solvent and said first material is insoluble in said first solvent. In step b., removing said core comprises dissolving said core in said first solvent. In an embodiment, said second material is a water soluble polymer and said first material is a non-water soluble polymer. In step b., removing said core comprises dissolving said core in water.

In an embodiment, said first material is one of polypropylene and polyester.

In an embodiment, in step c. providing said reflective material on said first part of said surface of each of said plurality of fibers comprises: coating said first part of said surface of each of said plurality of fibers with said reflective material in said fluid state; removing an amount of said reflective material not coating said first part of said surface of each of said plurality of fibers; and enabling said reflective material coating said first part of said surface of each of said plurality of fibers to solidify.

In an alternative embodiment, in step c. providing said reflective material on said first part of said surface of each of said plurality of fibers comprises substantially filling said void with said reflective material in said fluid state and enabling said reflective material to solidify.

In an embodiment, the method further comprises step e. comprising substantially filling said void with a polymer in a fluid state and enabling said polymer in said fluid state to solidify.

In an embodiment, forming said core and forming said plurality of fibers comprises simultaneously extruding said core and said plurality of fibers.

In an embodiment, said reflective material is one of a reflective metal, a reflective alloy and a polymer doped with reflective particles.

In an embodiment, in step a. each of said plurality of fibers is formed having a substantially circular cross-section. In an alternative embodiment, in step a. each of said plurality of fibers is formed having a substantially elliptical cross-section.

In an embodiment, said internal section is substantially circular in cross section and has radius, $R_{core}$, and each said fiber has a radius, $R_{surface}$. Said plurality of fibers, N, is inversely proportional to the ratio of $R_{surface}$ to $R_{core}$.

In an embodiment, each of said plurality of fibers arranged just touching a directly preceding one of said plurality of fibers and just touching a directly subsequent one of said plurality of fibers, and said plurality of fibers, N, is given by $$N = \frac{\pi}{\arcsin\left(\frac{R_{surface}}{R_{core}}\right)}$$

In an embodiment, the maximum radius, $R_{surface}$, of each of said plurality of fibers is given by, $$R_{surface} = R_{core}\sin\left(\frac{\pi}{N}\right),$$

where N is said plurality of fibers.

In an embodiment, said first material has a refractive index in the range 1.5 to 2.2. In an embodiment, said first material has a refractive index in the range 1.85 to 2.05. Preferably, said first material has a refractive index of substantially 1.9.

In an embodiment, said first material is substantially optically transmissive at visible wavelengths of light. In an alternative embodiment, said first material is substantially optically transmissive at infra-red wavelengths of light and is substantially absorptive at visible wavelengths of light.

In an embodiment, in step a. said core is formed having a circular cross-section. In an alternative embodiment, in step a. said core is formed having a non-circular cross-section, such as a square, rectangular or triangular cross-section.

"Retro-reflectivity" or "retro-reflection" refers to the optical phenomenon in which reflected light rays preferentially follow a path close to the opposite of the direction from which they were incident on a medium.

"Textile" is typically (but need not be) a woven or knitted material, and can include a cloth and a fabric.

"Visible wavelengths" refers to wavelengths of light that lie within the range approximately 400 nm to 800 nm.

"Infrared" refers to the region of the electromagnetic spectrum that lies at wavelengths longer than those associated with visible light (which range from approximately 400 nm to 800 nm) but at wavelengths shorter than those associated with microwaves, which are typically longer than 1 mm.

The aspects noted above recite many features of the invention. Any of the features noted herein can be combined with any of the other features in any of the aspects, practices or embodiments of the invention described herein, except where clearly mutually exclusive or a statement is explicitly made herein that such a combination is unworkable or otherwise outside scope of the invention. To avoid undue repetition and length of the disclosure, all the possible combinations of features are not explicitly recited.

Not every component is labeled in every one of the foregoing figures, nor is every component of each embodiment of the invention shown where illustration is not considered necessary to allow those of ordinary skill in the art to understand the invention. The figures are schematic and not necessarily to scale.

When considered in conjunction with the foregoing figures, further features of the invention will become apparent from the following detailed description of non-limiting embodiments of the invention.

DETAILED DESCRIPTION

Various features of the invention will be described with respect to the following exemplary embodiments, however, the invention is not limited to the following combinations of features. The various aspects of the invention described herein can be combined and applied in the manner needed to further enhance, optimize or tune the optical performance to attain the results needed for a given application.

Figure 1:
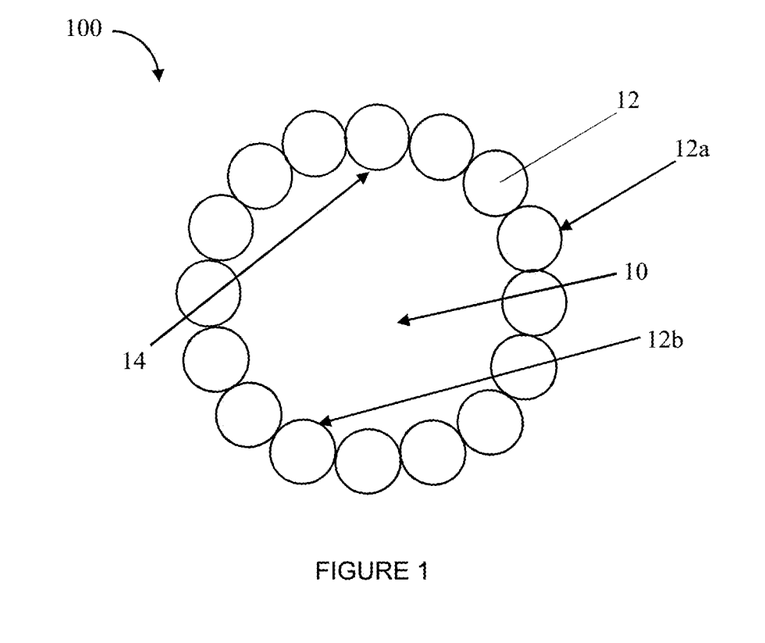
FIG. 1 schematically illustrates a cross-section of a retro-reflective thread according to a first embodiment of the invention.

FIG. 1 illustrates an exemplary retro-reflective thread 100 comprising an internal section 10, a plurality of fibers 12 and a reflective material 14. Each fiber 12 comprises a respective longitudinal axis and a respective surface 12a. Each fiber 12 comprises a first material that is at least partially optically transmissive. The fibers 12 are configured with their respective longitudinal axes substantially co-linearly aligned with one another and the fibers 12 are interconnected in series around the internal section 10. The fibers 12 are just touching one another. A first part 12b of the surface of each fiber 12 faces into the internal section 10. The reflective material 14 is provided on said first part 12b of the surface of each fiber 12.

Figure 2:
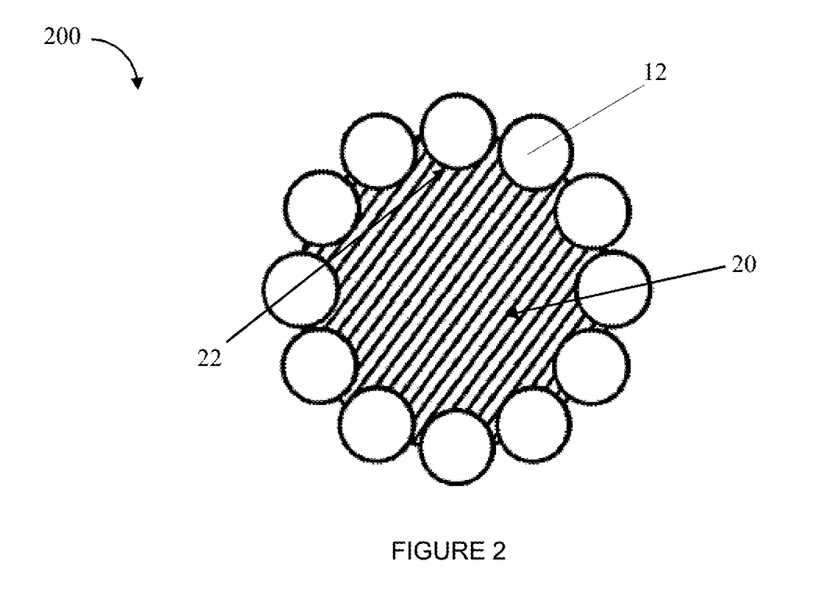
FIG. 2 schematically illustrates a cross-section of a retro-reflective thread according to a second embodiment of the invention.

FIG. 2 illustrates a retro-reflective thread 200 according to a second embodiment of the invention. In this embodiment the internal section comprises a core fiber 20 having a longitudinal axis and a surface. There are twelve fibers 12 which are configured with their respective longitudinal axes substantially co-linearly aligned with the longitudinal axis of the core fiber 20 and are arranged in series around the surface of the core fiber 20. In this embodiment, the fibers 12 are slightly separated from one another.

The core fiber 20 is made of the reflective material, in this example a metal, such as Indium. The reflective material may alternatively be a reflective alloy or a reflective particulate-doped material, such as a transparent polymer doped with particles of a reflective metal or alloy. The fibers 12 are made of a polymer that is transparent at visible wavelengths of light, having a refractive index in the range 1.85 to 2.05. The fibers 12 may for example be made of polypropylene or polyester. The fibers 12 have a radius of 13 μm and the core fiber 20 has a radius of 50 μm.

Figure 3:
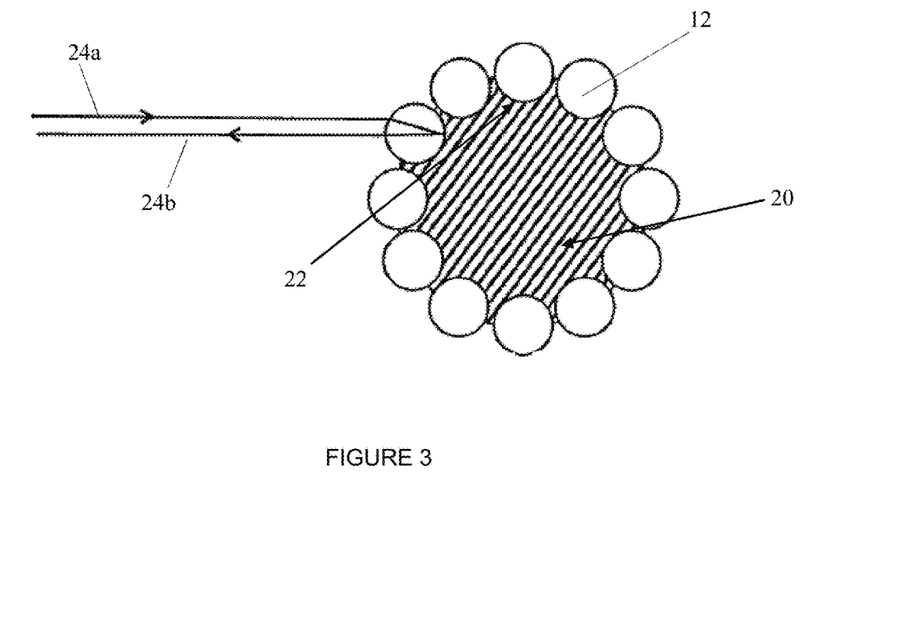
FIG. 3 schematically illustrates retro-reflection of light from the retro-reflective thread of FIG. 2.

The retro-reflectivity of the retro-reflective thread 200 is attributed to the lensing action of the fibers 12 and the reflectivity of the reflective material of the core fiber 20. Referring to FIG. 3, incident light 24a enters a fiber 12 and is refracted towards the opposite side. The incident light 24a is then reflected at the interface of the fiber 12 and the reflective core fiber 20. The outgoing light 24b is retransmitted across the fiber 12 and exits the fiber 12.

Figure 4:
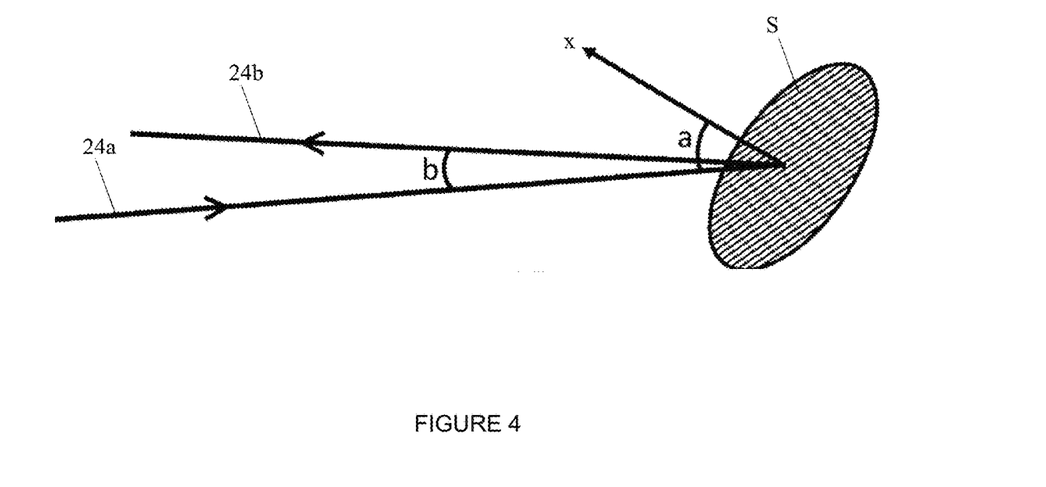
FIG. 4 schematically illustrates retro-reflection of light from a Lambertian surface.

Ray-tracing simulations have been performed to determine the retro-reflectivity of the retro-reflective thread 200. To ensure accuracy of the simulations, comparison with measurements were performed. The measurement setup is illustrated in FIG. 4. Angle a refers to the angle of incidence or entrance angle, i.e. the angle between the incident light 24a and the surface normal, x. Angle b refers to the observation angle, i.e. the angle between the incident light 24a and the outgoing light 24b. The light source was a weakly collimated white light source with detector diodes directly adjacent to it. Thus direct retro-reflection could be measured. Retro-reflection of a white light source from a Lambertian surface S was measured for comparison.

Retro-reflection was measured for the following objects: 1) plain round fibers, 2) the retro-reflective thread 200, and 3) a retro-reflective beads tape. For the retro-reflective thread, the fibers 12 were aligned in an array with enough space between them to prevent multiple scatterings.

First the retro-reflected power from the white Lambertian surface was measured, then the retro-reflected power from the object was measured. The ratio between the two powers was then calculated. A ratio of greater than 100% indicates that the retro-reflective thread 200 exhibits more retro-reflectivity than the Lambertian surface, while a ratio below 100% indicates less retro-reflectivity than the Lambertian surface. Measurements were made for entrance angles of 5°, 10°, 20°, and 30°. The entrance angle is aligned orthogonal to the object. The observation angle was fixed at 0°. The following table lists the measured retro-reflection of each object relative to the reference white Lambertian surface for each entrance angle:

| Entrance angle | Round polymer fiber | Retro-reflective thread | Retro-reflective bead tape |
|---|---|---|---|
| 5° | 22% | 2583% | 2539% |
| 10° | 22% | 2542% | 2539% |
| 20° | 23% | 2708% | 2539% |
| 30° | 24% | 2750% | 2539% |

Figure 5:
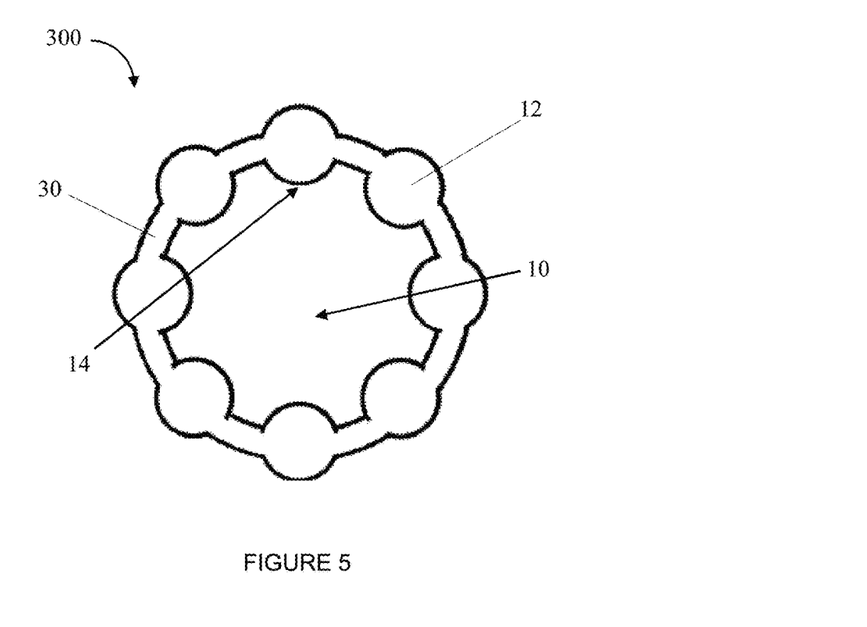
FIG. 5 schematically illustrates a cross-section of a retro-reflective thread according to a third embodiment of the invention.

FIG. 5 illustrates a retro-reflective thread 300 according to a third embodiment of the invention. In this embodiment the fibers 12 are arranged in a spaced series with a connecting element 30 provided between each pair of fibers 12, each connecting element 30 interconnecting a respective pair of fibers 12.

Figure 6:
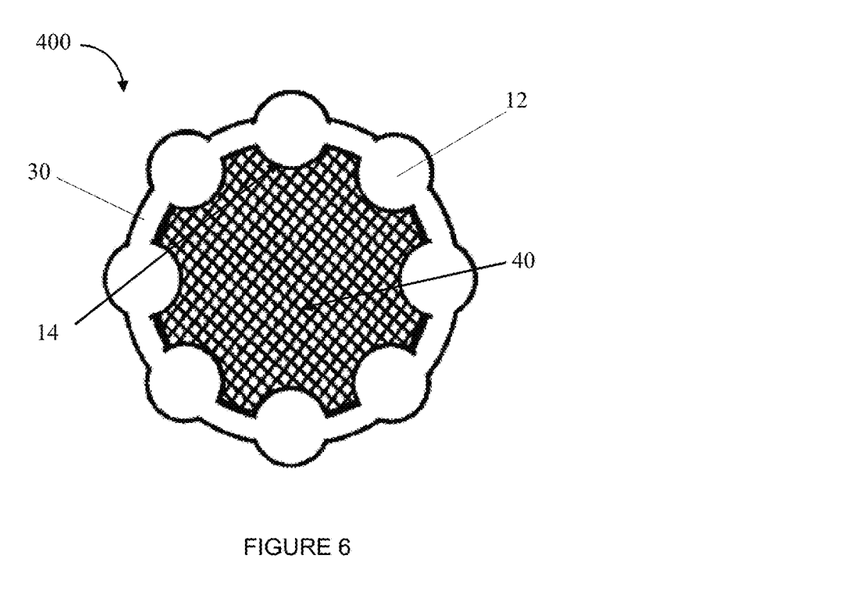
FIG. 6 schematically illustrates a cross-section of a retro-reflective thread according to a fourth embodiment of the invention.

FIG. 6 illustrates a retro-reflective thread 400 according to a third embodiment of the invention. In this embodiment the internal section comprises a core fiber 40 having a longitudinal axis and a surface. There are eight fibers 12 which are configured with their respective longitudinal axes substantially co-linearly aligned with the longitudinal axis of the core fiber 20 and are arranged in series around the surface of the core fiber 20, interconnected by connecting elements 30.

The core fiber 40 is made of the reflective material, in this example a metal. The reflective material may alternatively be a reflective alloy or a reflective particulate-doped material, such as a transparent polymer doped with particles of a reflective metal or alloy. The fibers 12 are made of a transparent polymer having a refractive index of approximately 1.9. The fibers 12 have a radius of 13 μm and the core fiber 20 has a radius of 50 μm.

The core fiber 40 may alternatively be made of a polymer material, the reflective material being provided as a coating layer between the fibers 12 and the polymer core fiber 40.

Figure 7:
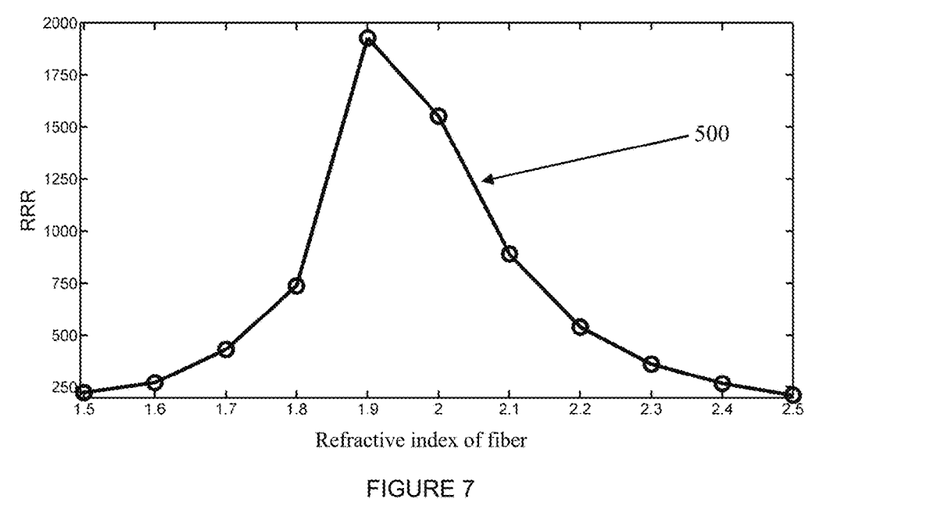
FIG. 7 shows a plot of retro-reflected power, RRR, as a function of fiber refractive index for a retro-reflective thread according to a fifth embodiment of the invention.

The key parameter for achieving high retro-reflectivity in the thread 400 is that the fiber-core fiber interface should be as lossless and reflective as possible, and fibers should have a refractive index of close to 1.9. This is illustrated in FIG. 7 which shows a plot 500 of retro-reflection, RRR, as a function of the refractive index of the fibers 12 for a retro-reflective thread according to a fifth embodiment of the invention having twelve fibers 12, the fibers 12 each having a radius of 13 μm and the core fiber 20 having a radius of 50 μm. As can be seen from the plot 500, to achieve the highest retro-reflection, the surface fibers' refractive index must be between 1.85 and 2.05.

Figure 8:
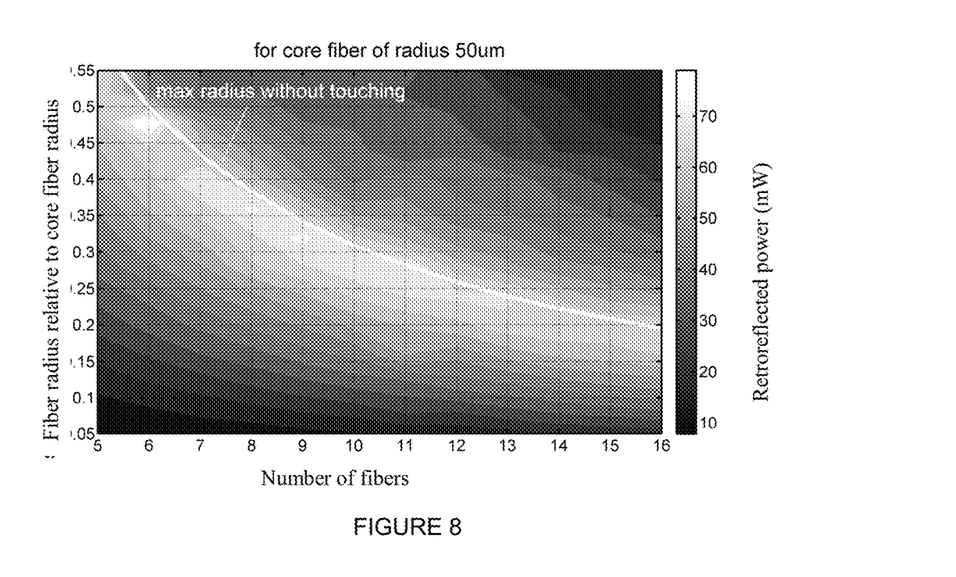
FIG. 8 shows a plot of retro-reflected power as a function of number of fibers and fiber radius relative to internal section radius for a retro-reflective thread according to a sixth embodiment of the invention.

Packing as many fibers 12 around the core fiber 40 is also necessary to achieve the highest possible retro-reflection. The number of surface fibers that can be fitted on the core fiber's surface without touching is given by $$N = \frac{\pi}{\arcsin\left(\frac{R_{surface}}{R_{core}}\right)}$$

where $R_{surface}$ is the radius of the fibers 12 and $R_{core}$ is the radius of the core fiber 40. For particular combinations of the two radii the number will be an integer, otherwise one can round down to the closest integer. Given the number of fibers 12 and the core radius, one can determine the radius of the fibers 12 that would just touch. The optimal number of fibers 12 for a given radius of the internal section, core fiber 40 in this embodiment, will cover as much as possible the circumference of the internal section while not touching. Shown in the plot in FIG. 8 is the retro-reflected power as a function of both the radius of the fibers 12 normalized by the core fiber radius and the number of fibers 12 for a retro-reflective thread according to a sixth embodiment of the invention. The white line indicates the maximum radius of the fibers 12 for a given number of fibers, i.e., $$R_{surface} = R_{core} \sin\left(\frac{\pi}{N}\right),$$

The optimal number of fibers 12 for a given radius is N, but N±1 will still yield high performance. But, in general overlapping fibers are detrimental to retro-reflection performance.

In the embodiments shown in FIG. 1 to FIG. 6 each of the fibers 12 has a substantially circular cross-section. As an alternative embodiment, each of the fibers 12 can be slightly non-circular, i.e. elliptical, in cross-section. As illustrated in the table below, using fibers 12 having an elliptical cross-section, with the semi-major axis along the core fiber 40 circumference (−10% deformation case) or along the radius of the core fiber 40 (+10% deformation case) cuts the retro-reflection in half, although it is still more than 10 times greater than for a white Lambertian surface.

| Fiber | non-deformed | −10% deformation | +10% deformation |
| --- | --- | --- | --- |
| Retro-reflection ratio | >2500% | >1100% | >1000% |

In the embodiments shown in FIG. 1 to FIG. 7 the internal section 10, 20, 40 has a substantially circular cross-section. As an alternative embodiment, the internal section 10, 20, 40 may have a non-circular cross-section, including, for example, a square cross-section, a rectangular cross-section or a triangular cross-section.

In a further embodiment, the fibers 12 are made of a material that is substantially optically transmissive at infrared wavelengths of light and is substantially absorptive at visible wavelengths of light.

Figure 9:
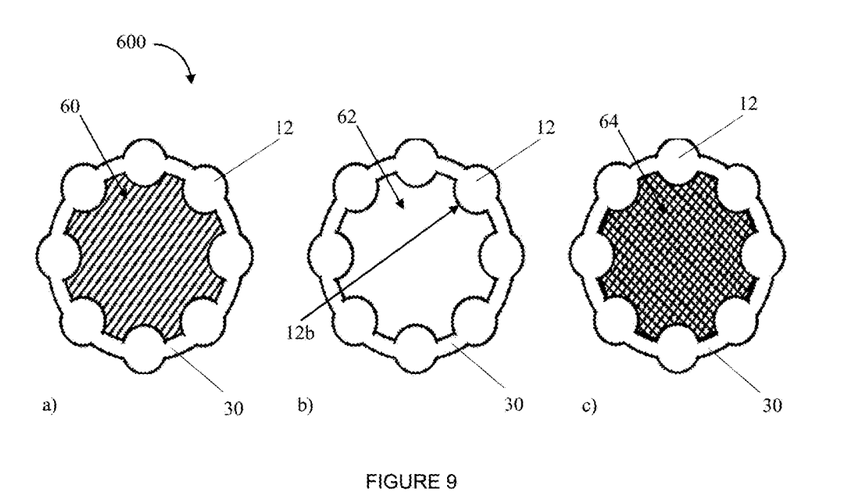
FIGS. 9A-9C schematically illustrates steps of a method of manufacturing a retro-reflective thread according to a seventh embodiment of the invention.
Figure 10:
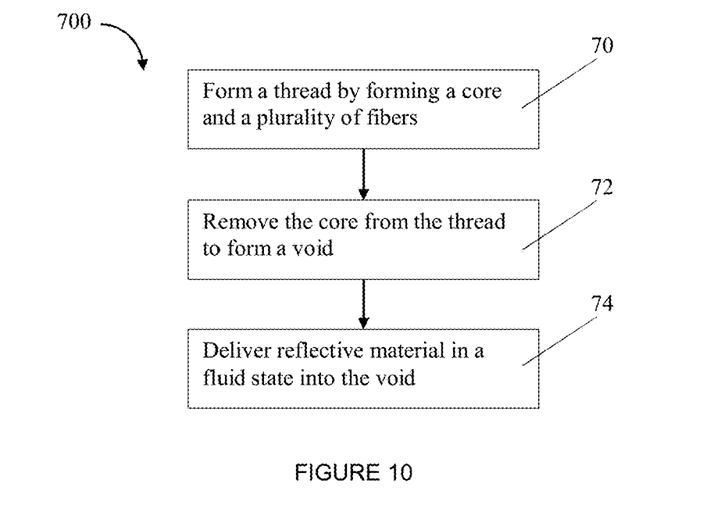
FIG. 10 illustrates steps of a method of manufacturing a retro-reflective thread according to an eighth embodiment of the invention.

FIG. 9 and FIG. 10 schematically illustrate the steps of an exemplary method 600 of manufacturing a retro-reflective thread. The method 600, 700 comprises the steps of:
  a. forming 70 a thread comprising a core 60 having an surface and a plurality of fibers 12;
  b. Removing 72 the core to form a void 62; and
  c. delivering 74 a reflective material 64 in a fluid state into the void.

In step a., each fiber 12 has a respective longitudinal axis and a respective surface. The fibers 12 are configured with their respective longitudinal axes substantially co-linearly aligned with one another. As can be seen in FIG. 9, the fibers 12 are interconnected in series around the core 60. Each fiber 12 comprises a first material that is optically transmissive at visible wavelengths of light.

In step b., the core 60 is removed such that a first part 12b of the surface of each fiber 12 faces into the void 62. By delivering a reflective material in a fluid state into the void 62, the reflective material is provided on said first part 12b of the surface of each of the fibers 12.

Figure 11:
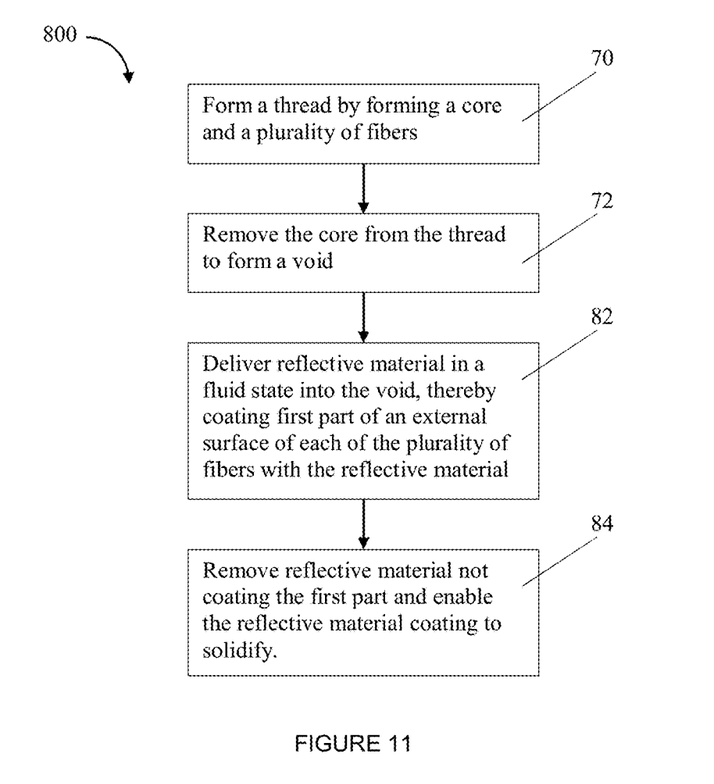
FIG. 11 illustrates steps of a method of manufacturing a retro-reflective thread according to a ninth embodiment of the invention.

FIG. 11 illustrates the steps of a method 800 of manufacturing a retro-reflective thread according to a ninth embodiment of the invention. In this embodiment, the fibers 12 are formed from a transparent polymer. The reflective material in a fluid state is delivered 82 into the void 62, so that said first part 12b of the surface of each fiber 12 is coated with the fluid reflective material 82. Fluid reflective material not coating a fiber 12 is then removed, leaving a coating of fluid reflective material on the fibers 12, and the reflective material is enabled to solidify to form a solid reflective material coating on the fibers 12. A suitable reflective material in the fluid state would be a molten metal, such as molten Indium which may be preferred due to its low absorption loss and its low melting point of 157° C., which allows it to be deposited on the polymer fibers 12 without damaging the fibers.

Figure 12:
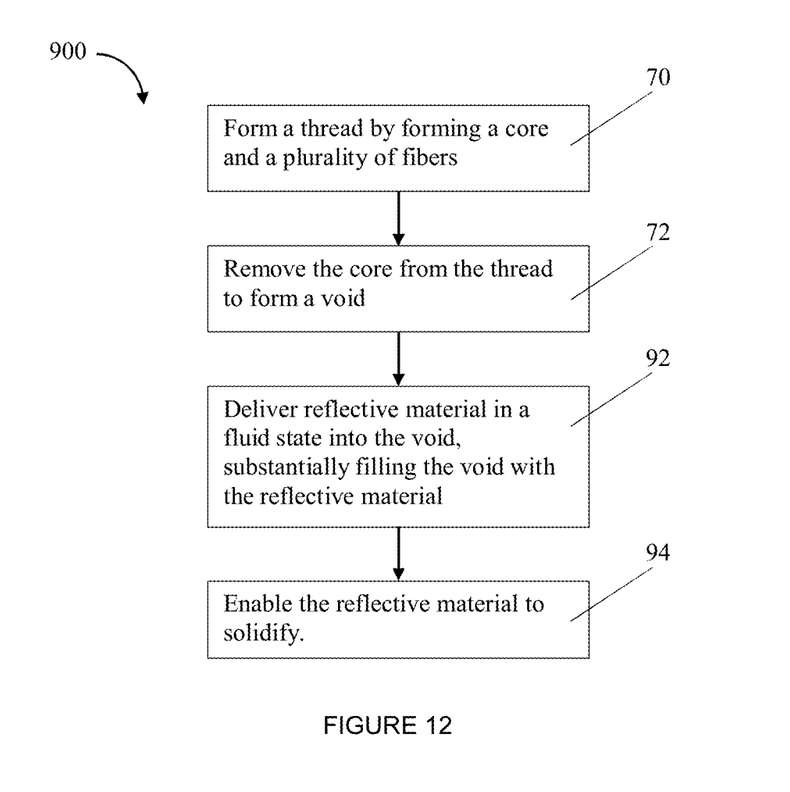
FIG. 12 illustrates steps of a method of manufacturing a retro-reflective thread according to a tenth embodiment of the invention.

FIG. 12 illustrates the steps of a method 900 of manufacturing a retro-reflective thread according to a tenth embodiment of the invention. In this embodiment, the void 62 is filled with reflective material in a fluid state 92, for example, molten Indium, and the reflective material is enabled to solidify 94. A solid core fiber may therefore be formed inside the fibers 12 formed in step a.

A further embodiment of the invention, described with reference to FIG. 9, provides a method of manufacturing a retro-reflective thread in which step a. comprises extruding a bi-component polymer fiber having the cross-section shown in FIG. 9 a). The outer fibers 12 are made of a non-water soluble polymer such as polypropylene. The core fiber 60 is made of a water-soluble polymer. Around the outer rim of the core fiber and joining the fibers is a thin ring of the non-water soluble polymer, forming connecting elements 30. In step b., the bi-component polymer fiber is exposed to water in order to dissolve the water-soluble core fiber 60, forming a void 62 internally to the fibers 12 and the connecting elements 30. In step c., molten metal is pumped into the void 62. Then either, the inside surface is coated, extraneous molten metal is removed and the molten metal allowed to solidify to form a metal coating, or the void 62 is filled and the molten metal is allowed to solidify to form a solid metal core fiber 64.

Figure 13:
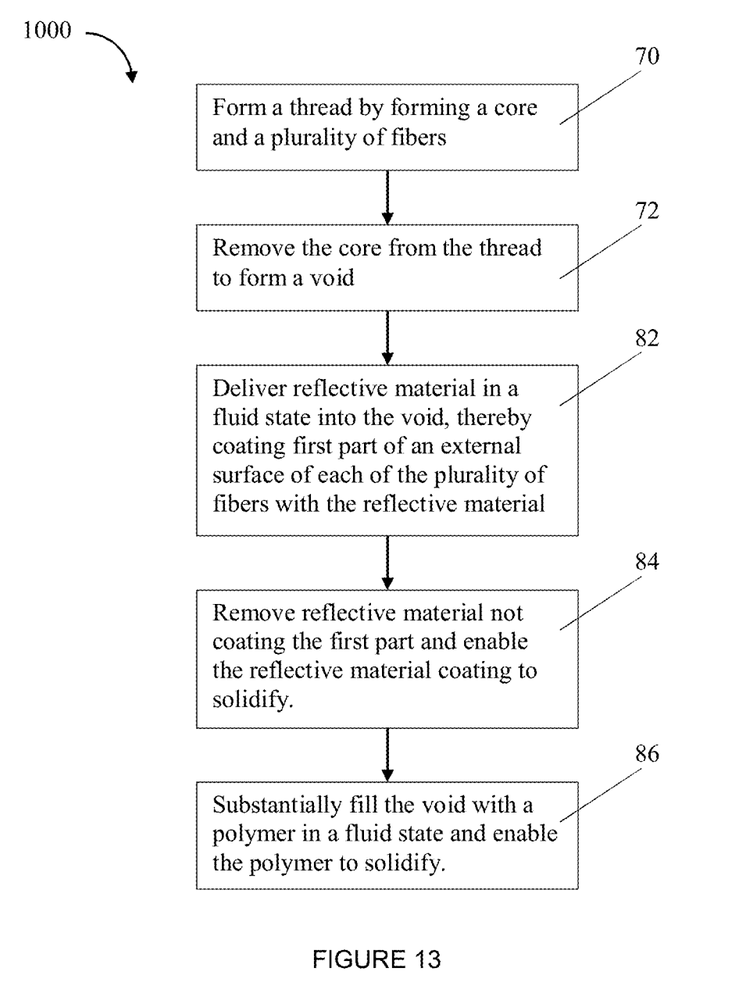
FIG. 13 illustrates steps of a method of manufacturing a retro-reflective thread according to a twelfth embodiment of the invention.

FIG. 13 illustrates the steps of a method 900 of manufacturing a retro-reflective thread according to a twelfth embodiment of the invention. In this embodiment, which is similar to the method 800 of FIG. 11, following formation of a solid reflective coating on the inside of the fibers 82, 84, the remaining void is filled with a polymer in a fluid state and the polymer is enabled to solidify, to thereby form a solid polymer core fiber.

Figure 14:
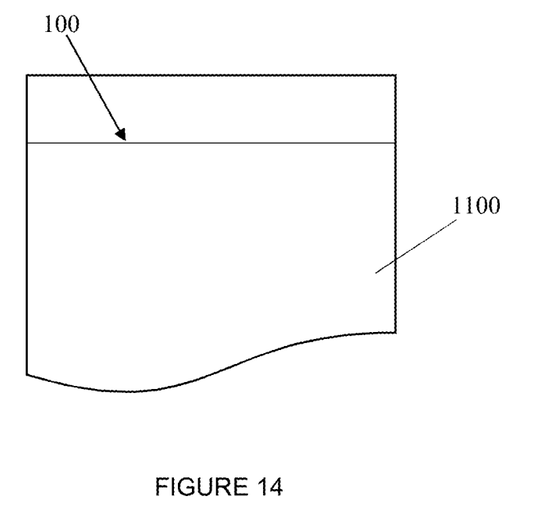
FIG. 14 illustrates a textile according to a further embodiment of the invention.

FIG. 14 illustrates a textile 1100 comprising at least one retro-reflective thread 100 as illustrated in FIG. 1. It will be appreciated by one of ordinary skill in the art that any of the retro-reflective threads 200, 300, 400 illustrated with reference to FIGS. 2 to 8 may alternatively be incorporated into a textile.

In a further embodiment, a textile is provided which is woven from a plurality of retro-reflective threads 100 as illustrated in FIG. 1. It will be appreciated by one of ordinary skill in the art that any of the retro-reflective threads 200, 300, 400 illustrated with reference to FIGS. 2 to 8 may alternatively be woven into a textile.

Textiles with retro-reflective threads incorporated into patterns of woven, braided, knitted and spun, and the like patterns, may have unique optical properties as a result of the continuously curved surface and resulting continuously varying angle of incidence of light.

The present disclosure is directed to each individual feature, system, material, and/or method described herein. In addition, any combination of two or more such features, systems, materials, and/or methods, if such features, systems, materials, and/or methods are not mutually inconsistent, is included within the scope of the present invention. To avoid undue repetition, not all features are discussed in conjunction with every aspect, embodiment or practice of the disclosure. Features described in conjunction with one aspect, embodiment or practice are deemed to be includable with others absent mutual inconsistency or a clear teaching to the contrary. In some instances, features will be discussed generally rather than in detail in conjunction with a specific aspect, embodiment or practice, and it is understood that such features can be included in any aspect, embodiment or practice, again absent mutual inconsistency or a clear teaching to the contrary.

Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used. Accordingly, the foregoing embodiments are presented by way of example only and that within the scope of the appended claims, and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure § 2111.03, 8th Edition, Revision 8. Furthermore, statements in the specification, such as, for example, definitions, are understood to be open ended unless otherwise explicitly limited.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time). "At least one of A, B or C" (as well as "at least one of A, B and C") reads on any combination of one or more of A, B and C, including, for example the following: A; B; C; A & B; A & C; B & C; as well as on A, B & C.

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one" feature with a particular characteristic does not mean the claim requires all features to have the specified characteristic.

What is claimed is:

1. A method of manufacturing a retro-reflective thread, the method comprising the steps of:
   forming a thread by:
   a. forming a core comprising a first surface; and
   forming a plurality of fibers, each said fiber comprising a respective longitudinal axis and a respective surface and wherein said plurality of fibers are configured with their respective longitudinal axes substantially co-linearly aligned with one another and said plurality of fibers are interconnected in series around said core, each said fiber comprising a first material that is at least partially optically transmissive;
   b. removing said core to form a void, said core being removed such that a first part of said surface of each of said plurality of fibers faces into said void; and
   c. delivering a reflective material in a fluid state into said void in a quantity sufficient to coat said first part of said surface of each of said plurality of fibers and solidifying said reflective material coating said first part of said surface.

2. The method of claim 1, wherein forming said plurality of fibers comprises forming said plurality of fibers in a spaced series and forming a plurality of connecting elements, each connecting element being formed between and interconnecting a respective pair of said plurality of fibers.

3. The method of claim 1, wherein forming said plurality of fibers comprises forming each of said plurality of fibers to be touching a directly preceding one of said plurality of fibers and to be touching a directly subsequent one of said plurality of fibers.

4. The method of claim 1, wherein said core comprises a second material that is soluble in a first solvent and said first material is insoluble in said first solvent, and wherein removing said core comprises dissolving said core in said first solvent.

5. The method of claim 1, wherein said core comprises a water soluble polymer and each of said plurality of fibers comprises a non-water soluble polymer.

6. The method of claim 1, wherein in step c. further comprises removing an amount of said reflective material not coating said first part of said surface of each of said plurality of fibers.

7. The method of claim 1, wherein in step c. further comprises substantially filling said void with said reflective material in said fluid state and enabling all said reflective material to solidify.

8. The method of claim 1, further comprising step d. comprising substantially filling said void with a polymer in a fluid state and enabling said polymer in said fluid state to solidify.

9. The method of claim 1, wherein forming said core and forming said plurality of fibers comprises simultaneously extruding said core and said plurality of fibers.

10. The method of claim 1, wherein said reflective material is one of a reflective metal, a reflective alloy and a polymer doped with reflective particles.

11. The method of claim 1, wherein in step a. each of said plurality of fibers is formed having one of a substantially circular cross-section and a substantially elliptical cross-section.

12. The method of claim 1, wherein said first part of said surface of each of said plurality of fibers is substantially circular in cross section and has radius, $R_{core}$, and each said fiber has a radius, $R_{surface}$, and wherein said plurality of fibers, N, is inversely proportional to the ratio of $R_{surface}$ to $R_{core}$.

13. The method of claim 1, wherein said first part of said surface of each of said plurality of fibers is substantially circular in cross section and has radius, $R_{core}$, and each said fiber has a radius, $R_{surface}$, and wherein each of said plurality of fibers is arranged just touching a directly preceding one of said plurality of fibers and just touching a directly subsequent one of said plurality of fibers, and said plurality of fibers, N, is given by $$N = \frac{\pi}{\arcsin\left(\frac{R_{surface}}{R_{core}}\right)}$$

14. The method of claim 1, wherein the maximum radius, $R_{surface}$, of each of said plurality of fibers is given by $$R_{surface} = R_{core} \sin\left(\frac{\pi}{N}\right),$$

where N is said plurality of fibers.

15. The method of claim 1, wherein said first material has a refractive index in the range 1.5 to 2.2.

16. The method of claim 1, wherein said first material has a refractive index in the range 1.85 to 2.05.

17. The method of claim 1, wherein said first material has a refractive index of between 1.85 and 2.05.

18. The method of claim 1, wherein said first material has a refractive index of substantially 1.9.

19. The method of claim 1, wherein said first material is substantially optically transmissive at visible wavelengths of light.

20. The method of claim 1, wherein said first material is substantially optically transmissive at infra-red wavelengths of light and is substantially absorptive at visible wavelengths of light.

21. The method of claim 1, wherein said core is formed in step a. having one of a circular cross-section and a non-circular cross-section.

\* \* \* \* \*